United States Patent Office 3,605,956
Patented Sept. 20, 1971

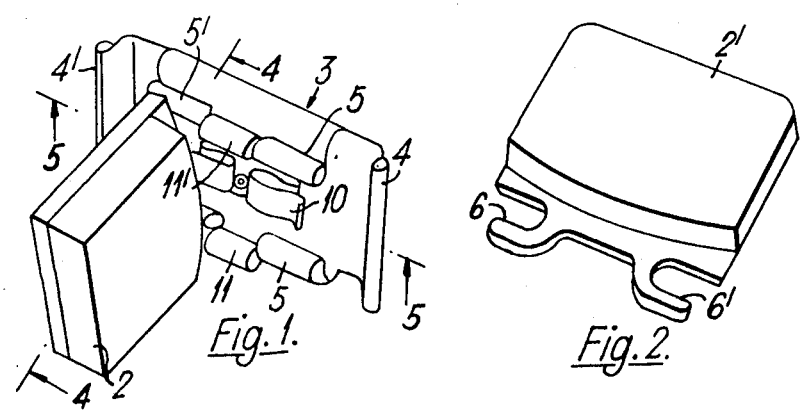
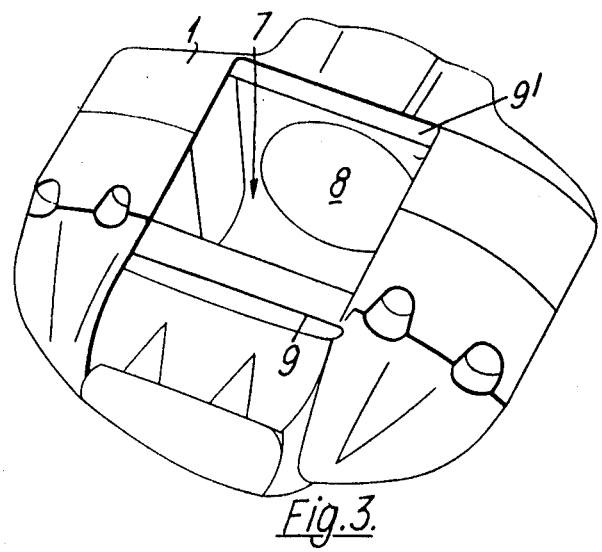
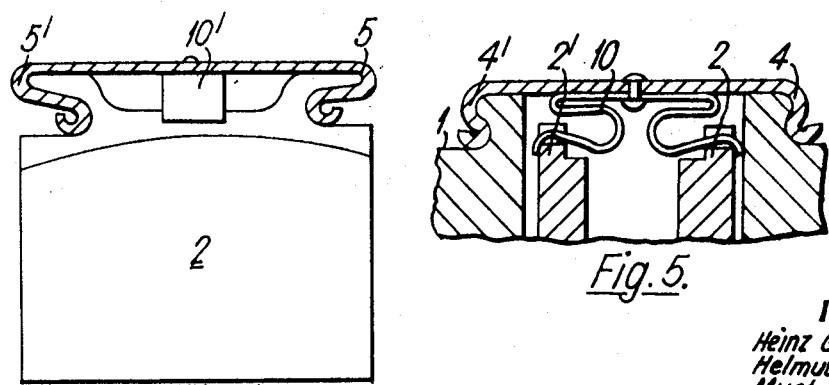

3,605,956
COMBINED COVER AND BRAKE PAD RETAINER FOR DISK BRAKES
Heinz Gunter Hahm and Helmut Marschall, Frankfurt am Main, and Mustafa Demirsoy, Darmstadt, Germany, assignors to International Telephone and Telegraph Corporation, New York, N.Y.
Filed Aug. 28, 1969, Ser. No. 853,681
Claims priority, application Germany, Aug. 29, 1968, P 17 75 586.1
Int. Cl. F16d 55/22
U.S. Cl. 188—72.3
2 Claims

ABSTRACT OF THE DISCLOSURE

A combined cover and brake pad retainer for disk brakes having an access opening adjacent to the disk for the replacement of the brake pads including a snap-on sheet metal cover plate with sides which are bent radially inward to form guide rails for the brake pads. A cross spring for urging the brake pads away from the disk is attached to the underside of the cover plate.

BACKGROUND OF THE INVENTION

This invention relates to a cover and brake pad retainer for disk brakes having a central opening in the caliper housing adjacent to the disk for the replacement of the brake pad assemblies.

As is well known in disk brakes, the actuating force is transmitted to the rotating disk through brake pad assemblies on either side of the disk. Each brake pad assembly includes a backing plate and friction material fixed to the backing plate. Various arrangements have been provided in the past for supporting the brake pad assemblies so that they are axially movable toward and away from the disk. However, in each of the known arrangements the removal of the brake pad assemblies requires several steps and often special tools.

SUMMARY OF THE INVENTION

It is an object of this invention to provide a combined cover and brake pad retainer which is inexpensive to manufacture and can be removed from the brake caliper housing, with the brake pads attached, in one simple step.

This object is achieved by combining the brake pad supporting means and the cover for the opening in the caliper housing in a single sheet metal plate having ends which are bent inward to form parallel tracks which fit into lateral recesses in the brake pad assemblies. The other ends of the plate are bent to form a snap-on connection with the caliper housing.

A cross spring for urging the brake pad assemblies away from the disk is riveted or soldered to the underside of the cover and brake pad retainer for urging the brake pads away from the disk.

In one embodiment of the invention the ends of the cover plate which form the parallel rails are each divided into three sections with the middle sections being bent out of line with the end sections to provide a stop for limiting the travel of the brake pads toward the disk.

BRIEF DESCRIPTION OF THE DRAWINGS

FIG. 1 is a perspective view of a cover and brake pad retainer according to the present invention with a brake pad assembly mounted on the retainer.

FIG. 2 is a perspective view of the brake pad assembly shown in FIG. 1.

FIG. 3 is a perspective view of the brake caliper housing.

FIG. 4 is a sectional view taken along the plane indicated by the line 4—4 in FIG. 1.

FIG. 5 is a partial sectional view of the cover and brake pad retainer taken on the plane indicated by the line 5—5 in FIG. 1.

DESCRIPTION OF THE PREFERRED EMBODIMENT

FIGS. 1 through 5 show a brake caliper housing 1, brake pads 2 and 2', and a cover and brake pad retainer 3. Two opposite ends of the retainer 4 and 4' are bent inward at an angle of more than 90° with the plane of plate. Both the other ends 5 and 5' of the plate are also bent to form an angle of more than 90° with the plane of the plate.

The brake caliper housing 1 has a central caliper opening 7 adjacent to the brake disk and at least one actuating piston 8 for forcing the brake pads against the disk.

The brake pad backing plates have lateral notches 6 and 6' which engage the rails 5 and 5' formed from the ends of the cover plate 3. The ends of the cover plate forming the rails 5 and 5' are resilient and the brake pad assemblies are inserted on the rails by merely spreading the rails apart and placing the notches 6 and 6' between the rails. When the rails are released, the brake pad assembly will be resiliently retained while being free to slide in an axial direction.

A spring 10, riveted or soldered to the underside of the cover assembly and having an undulated shape, urges the brake pads away from the disk while also preventing the brake pads from sliding off the outer ends of the rails 5 and 5'.

The rails 5 and 5' may be bent slightly so that they taper towards their inner ends. This taper combined with the spring 10 facilitates the return of the brake pads to their initial position after braking.

To insert the brake pads into the housing, they are first attached to the cover and brake pad retainer plate as described above and then the entire assembly is attached to the housing by inserting the brake pads into the caliper opening and spreading the resilient retaining ends 4 and 4' until they snap into place in the grooves 9 and 9' on the caliper housing.

In order to limit the brake pad wear and prevent the brake pad backing plates from coming in contact with the disk when the pads are worn out, the rails 5 and 5' are divided into three sections with the middle sections 11 and 11' being bent out of line with the end sections so that they form a stop for the brake pad assemblies.

It will be obvious that the cover and brake pad retainer shown and described herein can be conveniently and inexpensively manufactured from sheet metal stock thereby eliminating the conventional retaining pins and securing means for the brake pad assemblies.

It will be appreciated that the invention illustrated and described herein may be modified by those skilled in the art without deviating from the spirit and scope of the invention as set forth in the following claims.

We claim as our invention:
1. A cover and brake pad retainer for caliper disk brake comprising:
   a caliper housing including
      a central rectangular opening in said housing adjacent the brake disk; and
      a pair of grooves in said housing along opposite parallel edges of said opening;
   a rectangular sheet metal plate to cover said opening including
      a pair of parallel spring arms formed from said plate by bending one pair of parallel edges thereof out of the plane of said plate at an angle greater than 90°, each of said arms engaging a different one of said grooves to hold said plate in position, and a pair of parallel rails formed from said plate by bending the other pair of parallel edges thereof out of the plane of said plate at an angle greater than 90°;

a pair of brake pads;

a pair of brake pad backing plates, each of said backing plates carrying one of said pads and including a pair of lateral notches formed therein, each of said notches engaging a different one of said rails to resiliently retain said backing plate and its associated one of said pads; and a strip spring attached to the underside of said plate having two free ends each adapted to engage the top of a different one of said brake pads and urge said brake pads apart.

2. A cover and brake pad retainer according to claim 1, wherein each of said rails are divided into three sections, the center one of said three sections of each of said rails being bent toward each other out of line with the end ones of said three sections to provide stops for said brake pads.

References Cited

UNITED STATES PATENTS

| | | | |
|---|---|---|---|
| 2,918,990 | 12/1959 | Davis | 188—73.6X |
| 3,189,129 | 6/1965 | Burnett | 188—73.6 |

FOREIGN PATENTS

| | | | |
|---|---|---|---|
| 1,037,238 | 7/1966 | Great Britain | 188—73.3 |

GEORGE E. A. HALVOSA, Primary Examiner

U.S. Cl. X.R.

188—73.6, 216